Jan. 5, 1926.

W. H. DAY 1,568,809

DEVICE FOR TRANSFERRING RECORDS

Filed Dec. 21, 1923    7 Sheets-Sheet 1

Inventor
William H. Day
By Henry E. Rockwell

Attorney

Jan. 5, 1926.          W. H. DAY          1,568,809
DEVICE FOR TRANSFERRING RECORDS
Filed Dec. 21, 1923     7 Sheets-Sheet 2
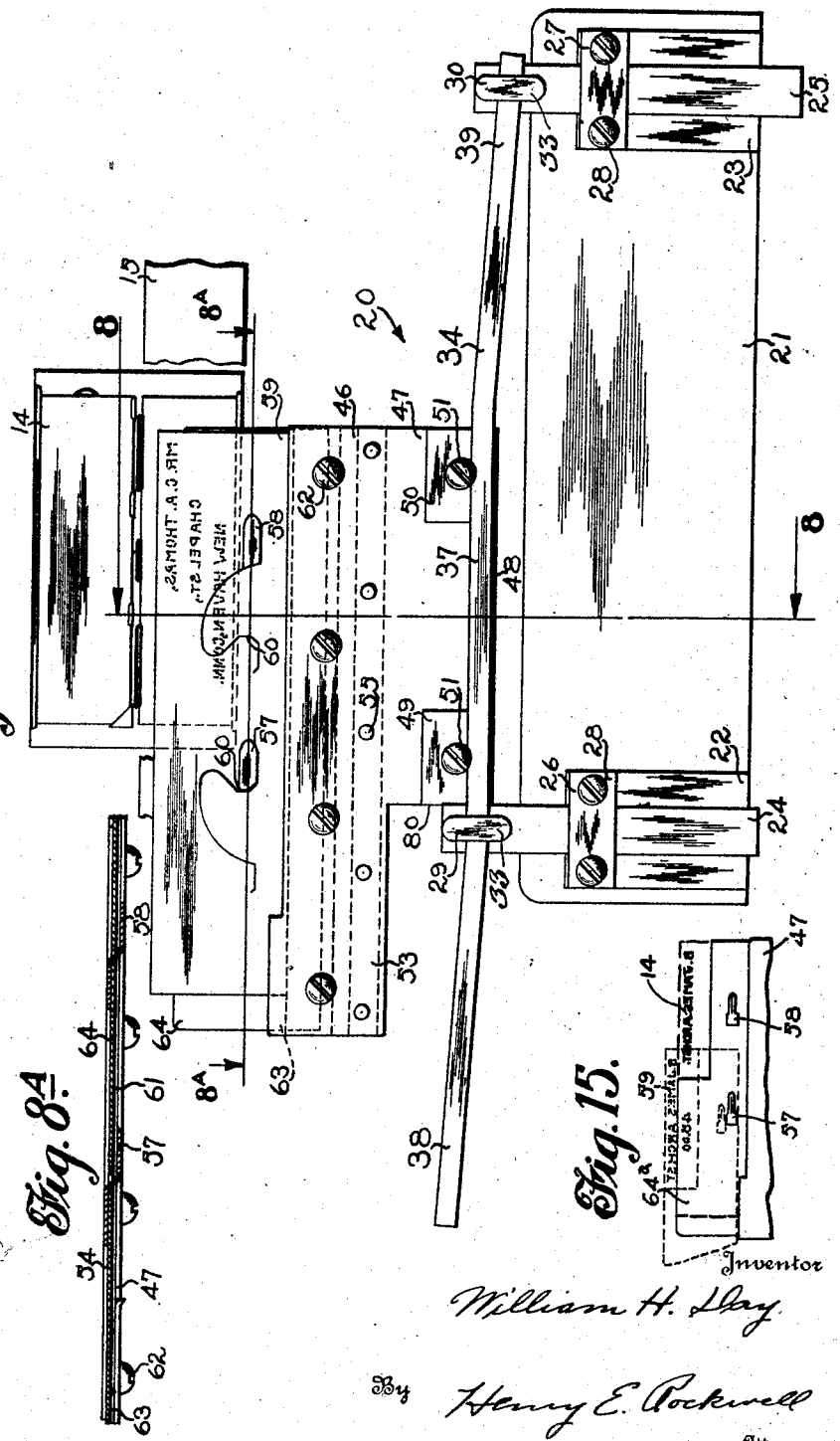

Jan. 5, 1926.
W. H. DAY
1,568,809
DEVICE FOR TRANSFERRING RECORDS
Filed Dec. 21, 1923 7 Sheets-Sheet 3
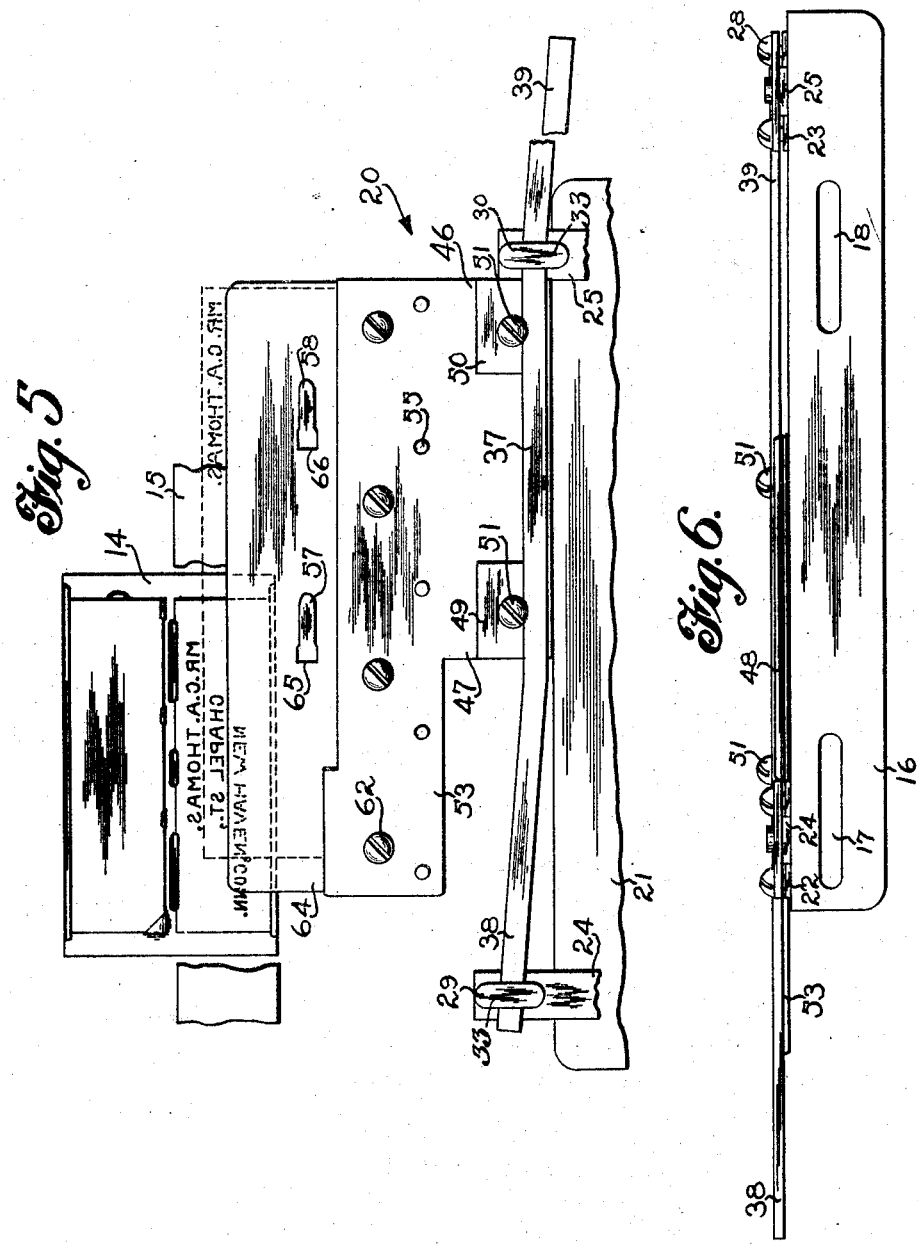

Jan. 5, 1926.  
W. H. DAY  
1,568,809  
DEVICE FOR TRANSFERRING RECORDS  
Filed Dec. 21, 1923  7 Sheets-Sheet 4
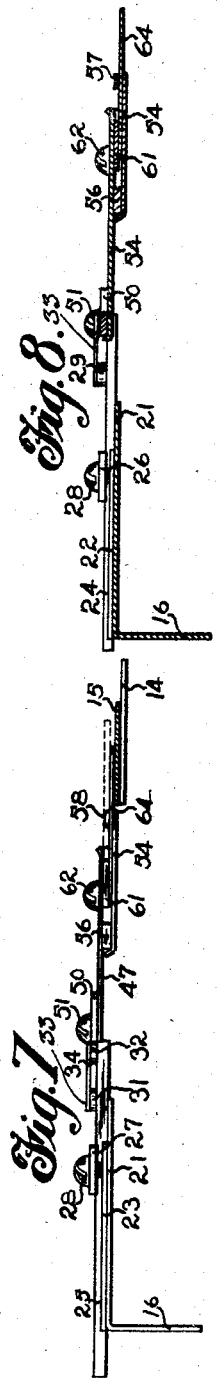
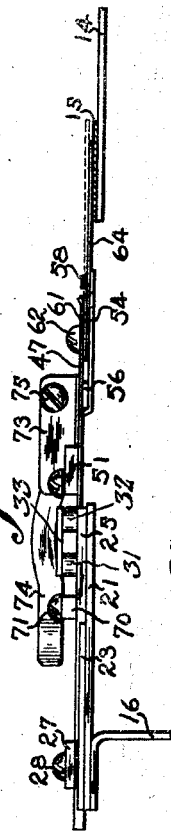
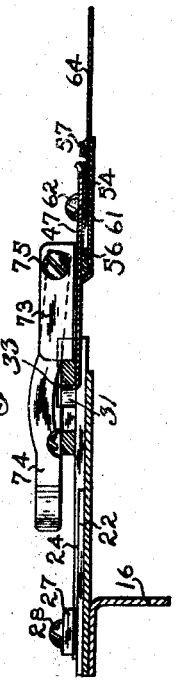
Inventor  
William H. Day  
By Henry E. Rockwell  
Attorney

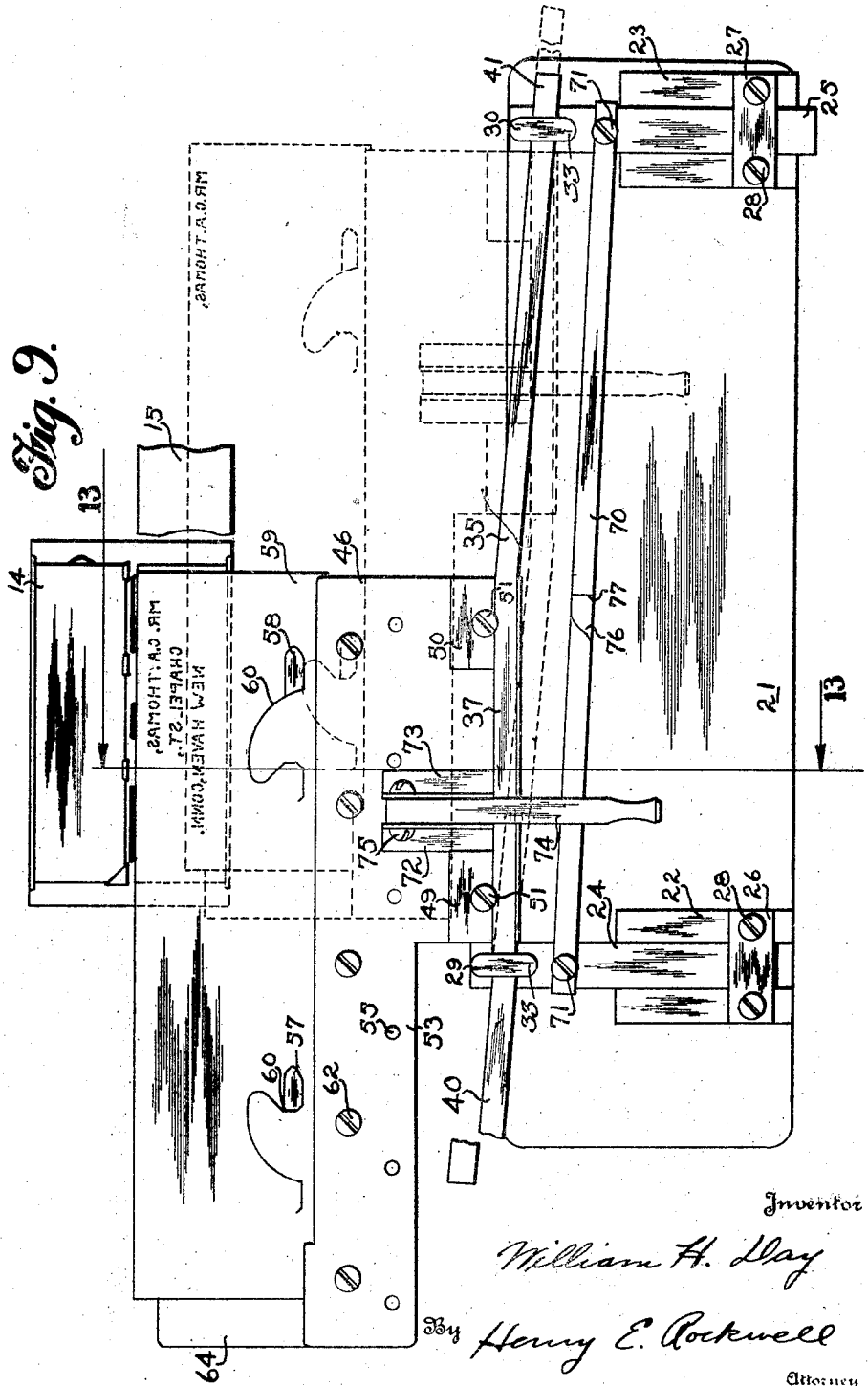

Jan. 5, 1926.  1,568,809
W. H. DAY
DEVICE FOR TRANSFERRING RECORDS
Filed Dec. 21, 1923   7 Sheets-Sheet 6
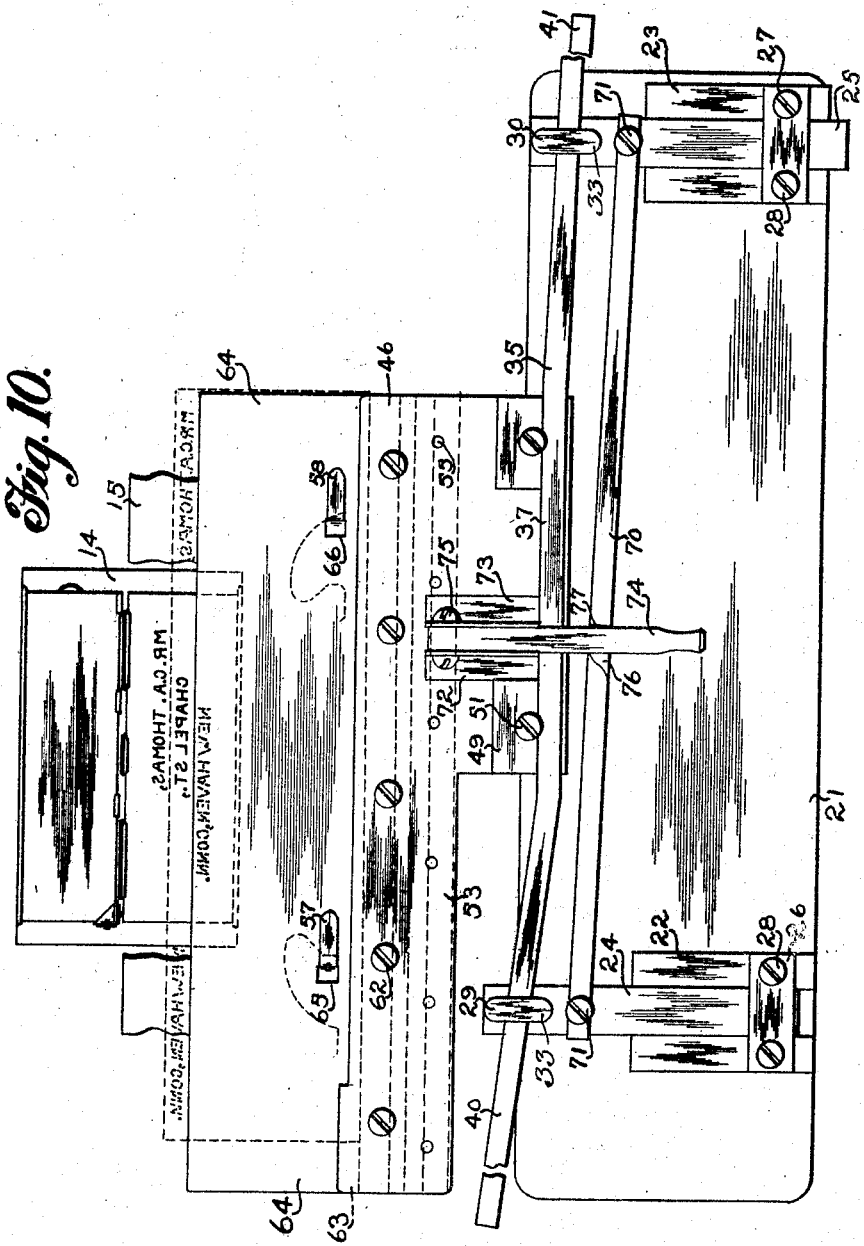

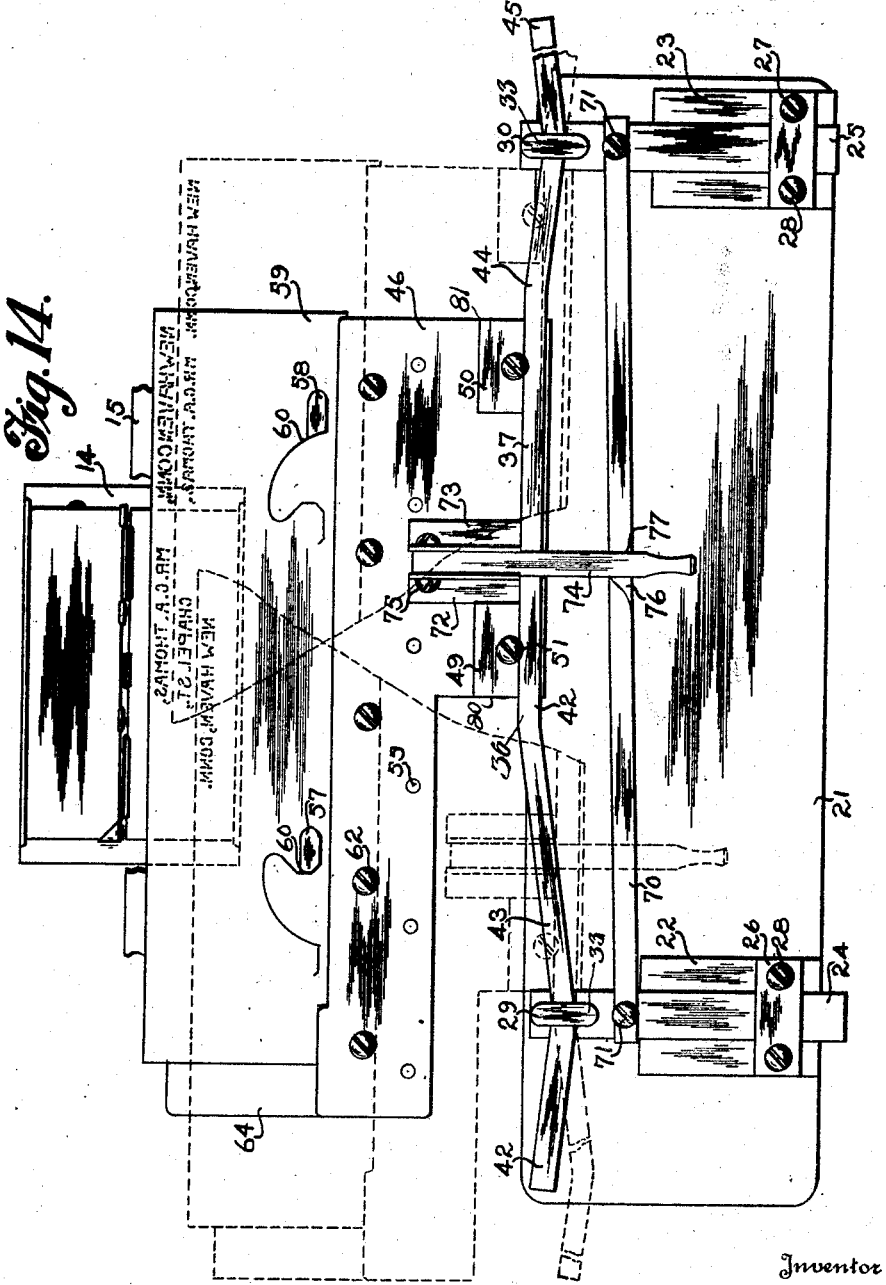

Patented Jan. 5, 1926.

1,568,809

UNITED STATES PATENT OFFICE.

WILLIAM H. DAY, OF EAST HAVEN, CONNECTICUT, ASSIGNOR TO INDEX VISIBLE, INC., OF NEW HAVEN, CONNECTICUT.

DEVICE FOR TRANSFERRING RECORDS.

Application filed December 21, 1923. Serial No. 682,048.

*To all whom it may concern:*

Be it known that I, WILLIAM H. DAY, a citizen of the United States, residing in East Haven, county of New Haven, and State of Connecticut, have invented certain new and useful Improvements in a Device for Transferring Records, of which the following is a full, clear, and exact description.

This invention relates to an attachment primarily intended for use in connection with addressing machines of the type wherein type plates bearing raised type or other printing device are adapted to print addresses or other data on separate sheets of papers or envelopes. In such machines the address or data is usually arranged upon the type or printing plate in the form of a column, and there is no provision whereby the address or the data may be transferred therefrom in any other arrangement. The invention seeks to provide a device easily attachable to such machines whereby the data upon the type plates may be transferred to a record receiving article such as an index card or the like, in other than the column arrangement. However, as will be pointed out in detail later, the fundamental principle involved is the transferring of data from previously assembled or set-up type or other form of printing device on to a record receiving element in an arrangement other than that in which they originally appeared.

This result has been found especially desirable by users of addressing machines when a copy of the data upon the plates is required for use in a card index or file. When obtaining such a copy from the plates, it is usually desirable that the data thereon be arranged in a straight line upon the cards of the index rather than arranged in the column form as upon the plate, in order to facilitate filing, etc. It is occasionally desirable to obtain more than one copy of the data and to have the transferred data arranged differently upon each set of cards in order that cross filing records may be provided, one being filed for example, alphabetically by the name of the individual and the other by street, name or town.

The principal object, therefore, of this invention is to provide an easily manipulated attachment or device capable of employment with a type plate, other previously set-up type or other printing device, by the use of which attachment the data borne upon the type may be readily transferred to a record receiving member, such as an index card or the like, in an arrangement different from that as set up upon the type plate.

Another object of this invention is to provide an improved device of this character, whereby various portions of the data upon the printing plate may be selected and printed upon a card or the like, in a previously determined arrangement regardless of the arrangement of the data upon the type plate or form.

Still another object of this invention is to provide a device of this character whereby, after transferring the record matter upon a series of record receiving members, the device may be so adjusted that the transfer of the data to another series of record receiving members may be made and a different arrangement will be obtained than that of the first series.

To obtain the above contemplated results and others which will appear later, the invention consists of the novel features and combinations of parts to be hereinafter described and claimed.

Reference is made to the accompanying drawings wherein;

Fig. 4 is a plan view of the device, embodying the principles of the invention shown in Fig. 3;

Fig. 5 is a view similar to Fig. 4, with certain parts shifted to another position;

Fig. 6 is a front view of the part shown in Fig. 4;

Fig. 7 is a side view of the part shown in Fig. 4;

Fig. 8 is a section on 8—8 of Fig. 4;

Fig. 8ª is a section on 8ª—8ª of Fig. 4;

Fig. 9 is a plan view in a somewhat modified form of a record transferring device;

Fig. 10 is a plan view of the device shown in Fig. 9, certain parts being in another position;

Fig. 11 is a front view of the device shown in Fig. 9;

Fig. 12 is a side view of the same;

Fig. 13 is a section on line 13—13 of Fig. 9;

Fig. 14 is a plan view of a device similar to the one shown in Fig. 9, but having certain parts of different form, and, Fig. 15 is a view of a similar device in a somewhat modified form.

Figure 1:
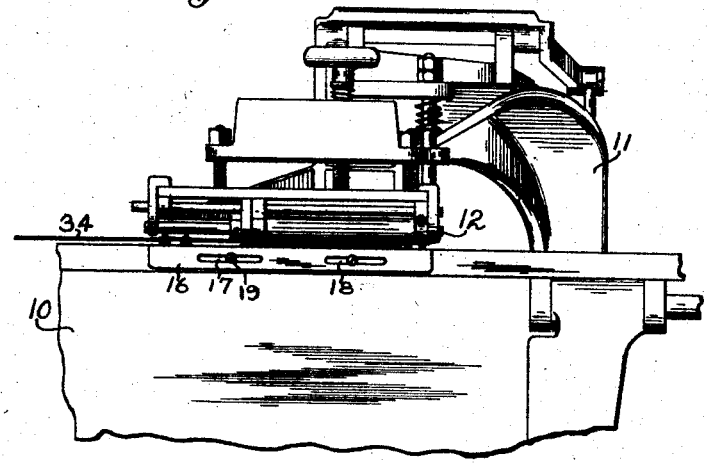
Fig. 1 is a front view of a well known type of addressing machine.
Figure 2:
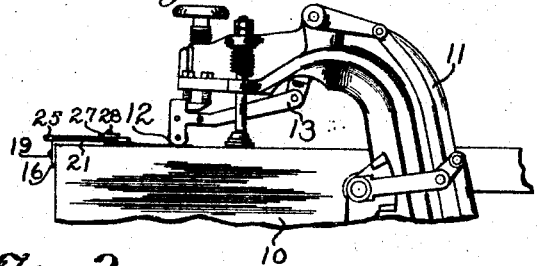
Fig. 2 is a side view of the same.
Figure 3:
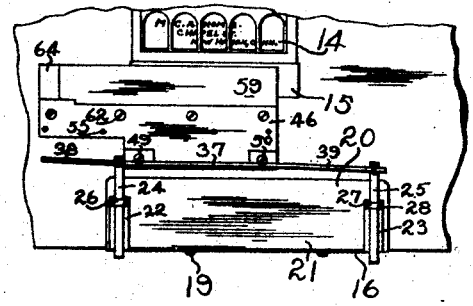
Fig. 3 is a plan view of the table of such machine upon which a device embodying this invention is shown mounted in operative position.

A well known type of addressing machine is illustated in Figs. 1 to 3, inclusive, to which a device embodying the principles and features of this invention is shown attached. The selected type of addressing machine illustrates one way by which the data borne upon the printing device which in this instance is a type plate is capable of being transferred to a record receiving member, such as an envelope, card or sheet, and comprises in general a frame 10 having an overhanging arm 11, upon which is mounted a spring pressed roller 12. By a system of swinging levers 13 the roller 12 is given a to and fro movement over the top surface of the frame 10. Suitably supported on the base 10 is a removable type plate 14, bearing an address or other data in raised type. Over the type plate 14 and under the roller 12 is a carbon ribbon 15 similar to a typewriter ribbon. As is readily obvious to those familiar with the operation of such machines, the record receiving member, when placed between the ribbon and the roller 12 will have an impression of the data borne by the type plate transferred to the under face of the same when the roller is moved across the card, pressing the same downwardly against the ribbon and type. The arrangement, however, of the impression after this operation will be the same as the arrangement of the type upon the type plate which, in this instance, is in the form of a staggered column.

To suit the style of addressing machine shown in the figures above referred to, the device or attachment of this invention, indicated in its entirety at 20, has been provided. Two forms of such a device are illustrated in the drawings, one of which (see Figs. 4 to 8ª, inclusive) is somewhat simpler in construction than the other (see Figs. 9 to 14). The principal difference between the two types is that an increase in the range of use is obtained with the latter because of certain added features and parts. The more complicated form, however, is easily changed from the arrangement as shown in Figs. 9 to 13 to the arrangement shown in Fig. 14, the difference in arrangement consisting merely in the substitution of one (differently shaped) part for another in order to produce a different result so far as detailed operation is concerned.

Parts common to both of the types shown will be referred to by the same reference characters, though in the more complicated type, similar parts are proportionately larger; and I shall describe first, the features and structure common to both types, and subsequently the features of the more complicated type that permit the additional range of use. It is to be understood from the above, however, that the more complicated type may be used by simple adjustment of parts in the same way as the simpler type, and when so adjusted will be adapted to accomplish the same results.

The device 20 consists of a securing plate 21 which by bending down a portion of the front edge thereof, as at 16, and providing this edge with elongated openings 17 and 18, forms the means by which the entire device 20 may be conveniently secured to the table or frame 10, by securing members such as screws 19. The plate 21 is subject to variations in size and shape to meet different conditions encountered when attaching the device to other styles of printing machines. The plate 21 also serves as the base upon which the other parts of the device are mounted. Mounted upon each end of the base plate 21 is a pair of guides consisting of bars 22 and 23, between each pair of which is slidingly mounted a member of a pair of supporting bars 24 and 25. Clamping members 26 and 27 lying transverse to the supporting bars serve to clamp these bars in position by means of screws or the like 28, threaded into the bars 22 and 23, respectively. Mounted upon the outer end of each of the supporting bars 24 and 25 are cam rod guides 29 and 30. The cam rod guides 29 and 30 may comprise rolling portions 31 and 32 pivotally mounted between the strap 33 and the respective bars 24 and 25, but are illustrated in the drawings with the cylindrical portions 31 and 32 riveted between the strap 33 and to the bars 24 and 25. Cylindrical portions 31 and 32 of the cam rod guides 29 and 30 are spaced apart a sufficient amount to allow interchangeable cam rods of various predetermined contours to slide therebetween, one form of cam rod being indicated as 34 in Figs. 4 and 5, and the other as 35 in Figs. 9 and 10, and still another as 36 in Fig. 14. Each of the forms of cam rods is constructed from a narrow flat bar of material, having the proper rectangular cross section to be slidable through the cam rod guides 29 and 30 and is provided with a straight portion 37 intermediate its ends. The end portions of the rods are bent out of alignment with the straight central portion 37 to form cam portions, such as 38 and 39 in Figs. 4 and 5, 40 and 41 in Figs. 9 and 10, and 42, 43, 44 and 45 in Fig. 14. These camming portions are mounted between the cylindrical portions or spaced posts 31 and 32 of the cam rod guides 29 and 30, respectively, between which they are allowed to slide longitudinally. After the insertion of these camming portions between the posts 31 and 32, the central portion 37 of the cam rod is adjusted to lie parallel with the upper edge of the base plate 21 by adjusting the relative forward or rearward position of the supporting bars 24 and 25. Such adjustment is made possible by loosening the clamping plates 26 and 27. In addition to such adjustment the portion 37 may be caused to lie closely adjacent the upper edge of the base 21 or spaced a predetermined distance therefrom. When adjusted to the desired position relatively to the base, the portion 37 is moved perpendicularly relatively to the base plate 21 by sliding the cam rod longitudinally, due to the camming action between the respective camming portions and the cam rod guides 29 and 30. Referring to Figs. 4 and 5, the movement of the cam rod 34, shown in one position in Fig. 4, to the position shown in Fig. 5, causes the central portion 37 to move closer to the upper edge of the base plate 21 while still remaining parallel therewith. By reversing the cam rod 35 so that the cam portion 38 is at the right and the portion 39 is at the left, a reverse motion of the cam rod 35 would be caused, i. e., when moved from left to right, it would move away from the base plate 21 instead of toward the same.

An index card or other record receiving article carrier 46 is detachably and adjustably mounted upon the straight portion 37 of the cam rods. The carrier 46 consists of a supporting frame or plate 47 formed from sheet material. The lower edge of the plate 47 is bent upwardly to form a shoulder 48. Blocks 49 and 50 are mounted upon the plate 47 and spaced sufficiently from the shoulder 48 to allow the cam rod portion 37 to lie between the same, where it is clamped by suitable clamping members, such as screws 51, threaded into the blocks with the heads thereof extending over the edge of the same and engaging the cam rods at a plurality of points upon the central portion 37. By loosening the clamping members 51, the carrier 46 may be longitudinally adjusted relatively to the cam rod and therefore relatively to the base plate 21. The upper portion of the carrier 46 extends beyond one of the edges thereof as at 53, a sufficient amount to properly support the maximum length of index card or the like which it is desired to use.

Card engaging means 54 is secured to the carrier frame 47 beneath the upper portion thereof. The card engaging means consisting preferably of a strip of non-corrosive material, such as aluminum, is secured to the frame 47 by the rivets 55, and is spaced therefrom by a spacing strip 56. The upper edge of the card engaging means or strip 54 is shown provided with a pair of card engaging fingers 57 and 58 so that cards 59 of the particular form shown may be engaged thereby. The fingers 57 and 58 extend longitudinally in the same direction and are raised from the surface of the body of the strip 54, so that they will readily pass through the index card 59 and engage the edges of die cuts 60 formed adjacent the lower edge of the card and assist in retaining the card in proper location on the carrier 46.

Card locating means 61 is removably secured to the carrier frame 47 between the frame and the strip 54 by removable retaining means, such as screws 62. The upper edge of the locating means or strip 61 acts as a guide and support for the lower edge of the card when the same is slipped between the frame 47 and the strip 54 on the fingers 57 and 58. An end stop 63 is provided to locate the card longitudinally and is secured to the frame 47 in proper location by suitable securing means and though shown permanently secured thereto could easily be arranged to be detachable and adjustable by the use of a screw or the like. In the particular device illustrated, the locating strip 61 is reversible so that when reversed and the lower edge is presented as the upper edge, the card having a greater distance between its lower edge and the die cut 60, will be properly located to allow fingers 57 and 58 to engage the said die cuts. By means of the locating strip 61 and the end stop 63 and without the use of the fingers 57 and 58, it is obvious that a card, sheet, or the like, not having a die cut 60 could be properly located upon the carrier 46.

A detachable type shield 64 having openings 65 and 66 properly spaced for engagement with the fingers 57 and 58 is provided. The shield 64 is of the proper width so that when in use the same will cover the body of the card 59 and expose only the upper margin thereof to the type, thereby preventing the type from impressing any data upon the card except at the exposed margin portion thereof. By providing a shield formed as at 64ª in Fig. 15, transfer of data from type arranged in alignment on the type plate to column form upon a card is made possible. The full lines in this figure show the position of the shield when printing the first portion of a line of type upon the upper margin of a card, and the dotted lines the position of the shield when printing the additional data beneath the first impression, the card 59 being indicated in dash lines.

The device illustrated in Figs. 9 to 14, inclusive, as previously noted, differs from the device shown in Figs. 4 to 8ª, inclusive, only by having the range of use increased by the addition of certain features and parts. In the device as illustrated in Figs. 9 to 13, inclusive, the cam bar 35 is in the same general form as the bar 34 of Figs. 4 to 8ª, except that the cam portions 40 and 41 allow a greater amount of perpendicular movement of the central portion 37 when the bar is shifted from one position to another. This allows the use of the device for the transfer of all three lines of data from a type plate, having the data arranged in a column of three lines, whereas in Figs. 4 to 8ª the device would only allow the transfer of two lines of such a column. In order to properly locate the frame 46 so that the intermediate line of type will be caused to imprint upon the margin of the card, as in Fig. 10, a releasable stop mechanism is provided. The stop mechanism comprises a rod 70 extending from one of the supporting bars 24 and 25 to the other, being detachably fastened thereto by screws 71. Uprights 72 and 73 are secured upon the frame and support a swingable catch member 74, pivoted at 75 thereto. In a predetermined location between the ends of the rods 70 a notch 76 is cut. This notch presents a shoulder 77 against which the catch member 74 abuts to stop the movement of the frame in one direction only, and is located in the proper position to allow the card carrying portion of the device to move into the proper lower position so that the margin of the card is presented above the second line of type, as shown in Fig. 10. Gravity is relied upon to insure engagement of the catch 74 with the shoulder 77 in the device as illustrated, but a spring suitably mounted to act against the catch 74 could be applied if more positive action was found to be necessary.

In Fig. 14 the cam rod 36 is of a slightly different form having the camming portions 42, 43, 44 and 45 arranged to first cause the card carrier to present the card margin to the type so that the last line of the column will be impressed first, the top line of the type when the catch 74 and the shoulder 77 are in engagement, and the intermediate line impressed when the device is released from such engagement and the sliding movement of the carrier 46 is continued.

The device when attached to an addressing machine operates as follows, it being first understood that the base is secured upon the table 10 of the machine, in the location as shown in Figs. 1 to 3, inclusive. Perpendicular adjustment is obtained by means of the supports 24 and 25 to cause the margin of the card 59 to lie in proper position to receive the impression from the type of the type plate. Referring to Figs. 4 to 8ª, inclusive, a card is inserted upon the carrier 46 as previously described, with its lower edge resting upon the locating strip 61 and an end abutting the locating stop 63. When cards of the type illustrated at 59 are used, the fingers 57 and 58 engage the die cut 60 and assist in retaining the cards upon the carrier. The carrier 46 is shifted to the left until the edge 80 of the same abuts the support 24, and the impression of the first line of the column of type is printed upon the margin of the card by the proper operation of the machine. The carrier 46 is then shifted to the right, being lowered in respect to the type or moved forwardly toward the front of the machine by the action of the cam portions 38 and 39 of the cam rod 34 in co-operation with the cam rod guides 29 and 30, where the edge 81 of the carrier abuts the support 25. Though not shown adjustable, the blocks 49 and 50 may be adjustably secured upon the carrier to form adjustable stops whereby the amount of sliding movement in either direction would be adjustable by the simple alteration of providing the blocks with elongated openings through which the securing members 51 could pass and be threaded into the supporting frame or plate 47. As shown, however, the width of the lower portion of the carrier frame 47 is such that the device is limited to use with a particular width of card. When shifted to the extreme right into the position as shown in Fig. 5, the next line of the type is impressed upon the card and due to the forward movement of the card, as explained above, the impression will be in alignment with the first impression. By forming the cam portion of the cam rod so as to move the carrier an amount equal to the distance between the two rows of type, the third line of the type, as in Fig. 9, could have been impressed instead of the second line, as in Fig. 5.

When the desired impressions have been printed on the card, it is removed from the carrier and another card is mounted thereon and the device is manipulated as above. Between impressions, the type plates may be changed either automatically by the operation of the addressing machine or by hand, as desired. By reversing the cam rod 34 so that the carrier is moved rearwardly when shifted to the right and forwardly when shifted to the left, the cards may be impressed with data having a reversed arrangement from that as shown in Figs. 4 and 5, as the lower line would be printed first instead of last.

The type of device shown in Figs. 9 to 13, inclusive, is operated in a similar manner as the above, except that the carrier is shifted from the full line position shown in Fig. 9, after having received the impression in the first line of the column of type, to the intermediate position controlled by the stop or catch member 74 abutting the shoulder 77, as shown in Fig. 10, where the second line of type is impressed upon the card. The stop 74 is then released from engagement with the shoulder 77 and the carrier shifted into the position shown in dotted lines in Fig. 9, in which position the card may receive the impression of the lowermost line of type.

In the type shown in Fig. 14, the cam rod 36 is formed in such a manner that the carrier is controlled by it to present the card margin to receive the lowermost line of type when the carrier and card are shifted to the left extreme; the uppermost line of type when at the intermediate position, and the intermediate line of type when shifted to the right extreme, the impression being printed upon the card in alignment. It is thus obvious that by providing various forms of cam rods the order in which the impressions are obtained is selectively controlled.

From the above it is obvious that the invention has provided a device adapted to allow the transfer of data from a transferring plate upon which it is arranged in a column form to a record receiving member upon which the imprint thereof will be arranged in a single line and whereby the individual lines of the column are selectively located in any predetermined position in the line upon the record receiving member. Reversely by the changing of one part for another the device may be adapted to select from a line of the data upon the transfer plate predetermined portions thereof, and allow the imprints of these portions to be arranged in column form upon a record receiving card.

While I have illustrated a preferred embodiment of my invention and described certain preferred uses of the same, it is to be understood that I do not limit myself to the details shown and described, as the invention is capable of many modifications and variations which lie within the spirit of the invention and the scope of the appended claims.

What I claim is:

1. An attachment for the purpose described comprising a base plate, a record member carrier, means slidingly connecting said carrier to said base plate, said means adapted to cause said carrier to move toward and away from said base plate when said means is shifted longitudinally of said base plate, and means mounted upon said base plate associated with said connecting means arranged to allow perpendicular adjustment of said connecting means relatively to said base plate.

2. An attachment for the purpose described comprising a base plate, a record member carrier, means connecting said carrier to said base plate including a cam bar secured to one of said parts, and a perpendicularly adjustable support for said cam bar secured to the other of said parts, said support being arranged to allow said cam bar to be shifted longitudinally in either direction.

3. An attachment for the purpose described comprising a base plate, a record member carrier, means connecting said carrier to said base plate including a cam bar secured to one of said parts, and a perpendicularly adjustable support for said cam bar secured to the other of said parts, said cam bar slidably connected to said support and co-operating therewith to guide one of said parts toward and away from the other when moved longitudinally relatively thereto.

4. An attachment for the purpose described comprising a base plate, a record member carrier, means connecting said carrier to said base plate including a cam bar secured to one of said parts, and a perpendicularly adjustable support for said cam bar secured to the other of said parts, said cam bar slidably mounted upon said support and having portions thereof co-operating therewith, whereby one of said parts is longitudinally movable relatively to the other toward and away therefrom yet parallel therewith.

5. An attachment for the purpose described comprising a base plate, a record member carrier, means connecting said carrier to said base plate including a cam bar secured to one of said parts, and a perpendicularly adjustable support for said cam bar secured to the other of said parts, said cam bar slidably mounted upon said support and having portions thereof co-operating therewith, whereby one of said parts is longitudinally movable relatively to the other toward and away therefrom yet parallel therewith, said carrier being provided with record member locating means whereby a record member is located thereon perpendicularly relatively to said base.

6. An attachment for the purpose described comprising a base plate, a record member carrier, means connecting said carrier to said base plate including a cam bar secured to one of said parts, and a perpendicularly adjustable support for said cam bar secured to the other of said parts, said cam bar slidably mounted upon said support and having portions thereof co-operating therewith, whereby one of said parts is longitudinally movable relatively to the other toward and away therefrom yet parallel therewith, said carrier being provided with record member locating means whereby a record member is located thereon perpendicularly relatively to said base, and longitudinally relatively to said cam bar.

7. An attachment for the purpose described comprising a base plate, a record member carrier, means connecting said carrier to said base plate including a cam bar secured to one of said parts, and a perpendicularly adjustable support for said cam bar secured to the other of said parts, said carrier being provided with record member locating means whereby a record member when mounted thereon is located perpendicularly relatively to said base plate and longitudinally relatively to said cam bar, said cam bar being slidingly connected to said support for longitudinal movement relatively thereto, and co-operating therewith when shifted to raise or lower said locating means perpendicularly relatively to said base plate.

8. In an attachment for the purpose described, a base plate, a record member carrier provided with a detachable camming member and perpendicularly adjustable means slidingly engaging said camming member mounted upon said base plate.

9. In an attachment for the purpose described, a base plate, a record member carrier provided with a detachable camming member and perpendicularly adjustable means slidingly engaging said camming member mounted upon said base plate, said camming member co-operating with said engaging means during relative longitudinal movement therebetween whereby said carrier is moved toward and away from said base plate.

10. In an attachment for the purpose described, a base plate, a record member carrier provided with a detachable camming member and perpendicularly adjustable means slidingly engaging said camming member mounted upon said base plate, said camming member co-operating with said engaging means during relative longitudinal movement therebetween whereby said carrier is moved toward and away from said base plate, but retained in parallel relation therewith.

11. In an attachment for the purpose described, a base plate, a record member carrier provided with a detachable camming member and perpendicularly adjustable means slidingly engaging said camming member mounted upon said base plate, said camming member co-operating with said engaging means during relative longitudinal movement therebetween whereby said carrier is moved toward said base plate when the movement is in one direction and away from said base plate when the movement is in the other direction.

12. In an attachment for the purpose described, a base plate, a record member carrier provided with a detachable camming member and perpendicularly adjustable means slidingly engaging said camming member mounted upon said base plate, said camming member co-operating with said engaging means during relative longitudinal movement therebetween whereby said carrier is moved toward said base plate when the movement is in one direction and away from said base plate when the movement is in the other direction, said camming member being reversible to cause the reversal of the movements of said carrier.

13. In an attachment for the purpose described, a base plate, a record member carrier provided with a detachable camming member, means mounted upon said base plate and perpendicularly adjustable relatively thereto, slidingly engaging and supporting said camming member whereby said carrier is longitudinally movable relatively to said base plate, and releasable stop means for arresting the movement of said carrier at a predetermined point within the moving range thereof.

14. In an attachment for the purpose described, a base plate, a record member carrier, said carrier having a cam bar extending beyond the side edges thereof and slidingly engaged by a pair of perpendicularly adjustable supports secured to said base plate whereby said carrier is allowed to shift longitudinally with respect to said base plate between said supports, said supports acting as stops, limiting the movement of said carrier in both directions.

15. In an attachment for the purpose described, a base plate, a record member carrier, said carrier having a cam bar extending beyond the side edges thereof and slidingly engaged by a pair of perpendicularly adjustable supports secured to said base plate whereby said carrier is allowed to shift longitudinally with respect to said base plate between said supports, said supports acting as stops limiting the movement of said carrier in both directions, and releasable stop means for arresting the movement of said carrier at a predetermined point between said supports.

16. In a device of the character described, a base plate, a card carrier, means on said carrier for engaging and locating a card, means associated with said carrier and carried thereby overlapping the body of a carried card to allow the exposure of only a margin of the card, means extending beyond both side edges of said carrier and slidingly engaged by perpendicularly adjustable supports secured to said base plate, said extended means being adapted to lower and raise said carrier with respect to said base plate while longitudinally moving relatively thereto whereby the exposed margin of the carried card is presented above one line of type upon a type plate, whereupon there is a plurality of lines of type arranged in column form, when the carrier is in one position and whereby the same is presented above another line of the type when in another position.

17. In an attachment of the character described, a base plate, a card carrier, a movement controlling member for said carrier, said controlling member consisting of a bar having a straight portion intermediate its ends and the ends bent at an angle therefrom, and means mounted upon the base plate to slidingly receive the ends of said member.

18. In a device of the character described, a base plate, a card carrier, a cam bar having a portion intermediate its ends secured to said carrier and having its end portions extending beyond the side edges thereof, said end portions bent at an angle to the intermediate portion, and means mounted upon said base plate to slidingly receive the end portions of said bar.

19. In a device of the character described, a base plate, a card carrier, a cam bar having a portion intermediate its ends secured to said carrier, and having its end portions extending beyond the side edges thereof, said end portions bent at an angle to the intermediate portion and parallel to each other, and means mounted upon said base plate to slidingly receive the end portions of said bar.

20. In combination with a printing machine having type set up in a plurality of lines, the lines being in a column, of means to carry an article to be imprinted, said means comprising a base plate, an article holder slidable longitudinally upon said plate, connecting means between said holder and said plate comprising a slidable cam bar member and a stationary guiding member therefor, said members co-operating to cause the article holder to present a surface of a held article to said type in steps whereby the impression made upon the article from the type is arranged in alignment.

21. In combination with a printing machine having type set up in a plurality of lines, the lines being in a column, of means to carry an article to be imprinted, said means comprising a base plate, an article holder slidable longitudinally upon said plate, connecting means between said holder and said plate, comprising a slidable member and a perpendicularly adjustable stationary member, said members co-operating to cause the article holder to present a surface of a held article to said type in steps whereby the impression made upon the article from the type is arranged in alignment.

22. In combination with a printing machine having type set up in a plurality of lines, the lines being in a column, of means to carry an article to be imprinted, said means comprising a base plate, an article holder slidable longitudinally upon said plate, connecting means between said holder and said plate comprising a slidable member and a stationary member, said members co-operating to cause the article holder to present a surface of a held article to said type in steps both perpendicularly and longitudinally whereby the impression made upon the article from the type is arranged in alignment.

23. In combination with a printing machine having type set up in a plurality of lines, the lines being in a column, of means to carry an article to be imprinted, said means comprising a base plate, a card carrier, said card carrier being provided with means to detachably retain a card thereon, and means to overlap the body of a carried card but to expose a margin thereof and connecting means between said carrier and said plate, including a slidable cam bar and stationary guide members therefor, said members co-operating to cause the carrier to present a portion of the exposed margin of the carried card to one line of said type when said slidable member is in one position relatively to the other, and another portion of the margin of the carried card to another line of said type when said slidable member is in another position.

24. An attachment, including a pair of members, means associated with one of said members for detachably holding an article to be imprinted therein, and a cam bar secured to one of said members engageable by the other of said members, for shiftingly connecting said members together.

25. An attachment, including a combination with a type plate and a roller, means for retaining an article to be imprinted, said means shiftable with respect to said type plate whereby the arrangement of the imprint is varied from the arrangement of the type upon the type plate and interchangeable cam bars for controlling said article retaining means in its movements whereby different arrangement of the imprint is obtainable.

26. In combination with a type plate having type arranged in lines one above the other, means for retaining an article to be imprinted, and means including a cam bar detachably secured to said article retaining means for controlling the same whereby the article is moved to cause the imprint upon said article to be in an arrangement different from that of the type upon said plate.

27. In combination with a type plate, movable means for retaining an article to be imprinted, and means for controlling the movement of said article retaining means comprising a cam bar secured to said article retaining means, and guides for said cam bar.

28. In combination with a type plate, movable means for retaining an article to be imprinted, and means for controlling the movement of said article retaining means comprising a cam bar detachably secured to said article retaining means, and adjustable guides for said cam bar, said guides being held stationary with respect to said type plate during the operation of printing.

29. In combination with a type plate, movable means for retaining the article to be imprinted, and means for controlling the movement of said article retaining means comprising interchangeable cam bars securable to said article retaining means, and guiding members for said cam bars.

30. In an attachment of the character described, a base plate, a card carrier, a movement controlling member for said carrier, said controlling member consisting of a bar having a straight portion intermediate its ends, and the ends thereof bent at an angle therefrom in different directions, and means mounted upon the base plate to slidingly receive the ends of said member.

31. An attachment including a pair of members, means associated with one of said members for detachably holding an article to be imprinted therein, and a cam bar secured to one of said members, slidably connected to the other of said members for shiftingly connecting said members together.

32. In combination with a record transferring device having the data thereon arranged in lines one above the other, means for retaining an article to be imprinted, and means including a slidingly mounted cam bar detachably secured to said article retaining means for controlling the same, whereby the article is moved to cause the imprint upon said article to be in an arrangement different from that of the data upon the record transferring device.

33. In combination with a record transferring device, movable means for retaining an article to be imprinted, and means for controlling the movement of said article retaining means, comprising a cam bar secured to said article retaining means and guides for slidingly engaging said cam bar.

34. In an attachment of the character described, a base plate, a card carrier, a movement controlling member for said carrier, said controlling member consisting of a bar having a straight portion intermediate its ends and having an end bent at an angle therefrom, and means mounted upon the base plate to slidingly receive both ends of said member.

35. In an attachment for the purpose described, a base member, a longitudinally movable record member carrier, a perpendicularly movable record member surface blocking member, and detachable camming means for controlling said carrier and said blocking member longitudinally movable with said carrier, and means to engage and guide said camming means.

In witness whereof, I have hereunto set my hand this 13th day of December, 1923.

WILLIAM H. DAY.